Figure 1:
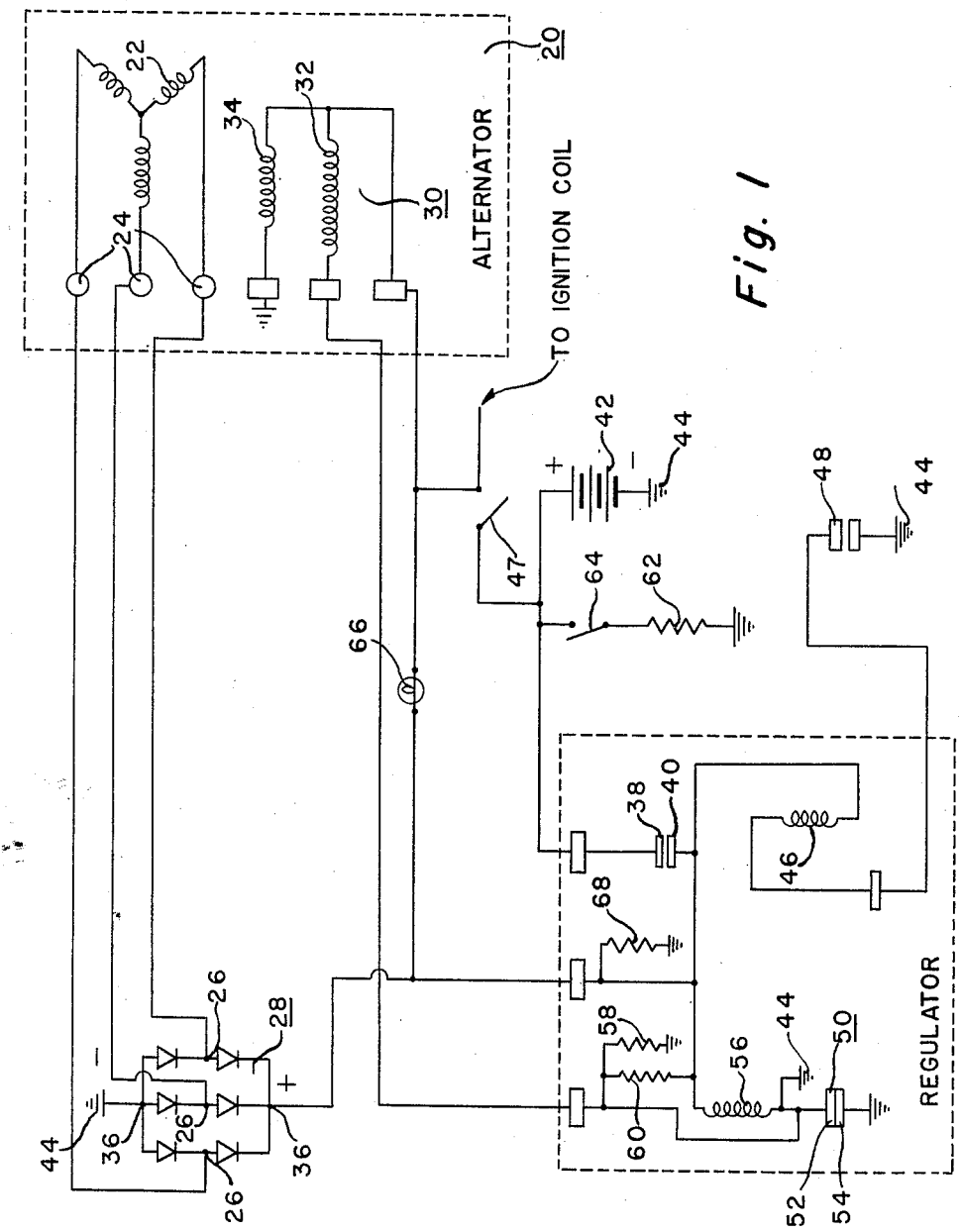

Dec. 24, 1957      L. J. RAVER      2,817,830
BATTERY CHARGING CIRCUIT

Filed July 14, 1955      2 Sheets-Sheet 1

INVENTOR.
Louis J. Raver
BY
His Attorney

Dec. 24, 1957  L. J. RAVER  2,817,830
BATTERY CHARGING CIRCUIT
Filed July 14, 1955  2 Sheets-Sheet 2

INVENTOR.
Louis J. Raver
BY
John I. Marvin
His Attorney

United States Patent Office 2,817,830
Patented Dec. 24, 1957

2,817,830

BATTERY CHARGING CIRCUIT

Louis J. Raver, Anderson, Ind., assignor to General Motors Corporation, Detroit, Mich., a corporation of Delaware Application July 14, 1955, Serial No. 522,007

9 Claims. (Cl. 340—249)

This invention relates to storage battery charging circuits and more particularly to systems wherein a storage battery is charged by an A. C. generator which is driven by a variable speed prime mover such as an engine of a motor vehicle.

Present day automotive vehicles are increasingly being supplied with alternating current circuits and alternators for supplying these circuits. These alternators, generally driven by the prime mover of the vehicle through a suitable rectifying means, supply direct current to the storage battery and the other direct current circuits which may be present. It is to be appreciated that, if the alternators are driven by the vehicle prime mover, their speeds will vary considerably and the output thereof will frequently fall beneath the value necessary to charge the storage battery. Further, while the alternating current systems are generally reliable, failures in the alternator or rectifier may occur and the battery may be subject to a severe discharge.

It is an object, therefore, of the present invention to provide a means in a vehicle battery charging circuit to indicate when the output of an alternator, driven by the prime mover of the vehicle, is sufficient to charge the battery.

It is a further object of the present invention to include a means in a vehicle battery charging circuit, which includes an alternator driven by the prime mover of the vehicle, to indicate that the storage battery is not being discharged through a closed external circuit.

Another object of the present invention is to include an indicating means in a battery charging circuit that includes an alternator which means is responsive to the output potential of both the alternator and battery and will indicate when the output of the alternator impressed on the circuit is sufficient to charge the battery.

A still further object of the present invention is to include an indicating light in a vehicle battery charging circuit which will be incandescent when the output of an alternator in said circuit is insufficient to charge said battery.

In carrying out the above objects, it is another object of the present invention to include a grounding resistance and indicating light in a battery charging circuit that is energized from an alternator through a rectifier, which light will become incandescent when the current from the battery passes through the light and a resistance during the periods when the alternator output potential is insufficient to overcome the potential of the battery.

In carrying out the above objects, it is another object to connect a relay means in an alternator rectifier battery charging circuit so that the relay is responsive to both the battery and alternator potentials and will close a circuit to an indicating lamp whenever the output potential of the alternator is less than the potential of the battery.

Further objects and advantages of the present invention will be apparent from the following description, reference being had to the accompanying drawings wherein preferred embodiments of the present invention are clearly shown.

In the drawings:

Figure 1 diagramatically shows a circuit diagram according to one embodiment of the present invention.

Figure 2:
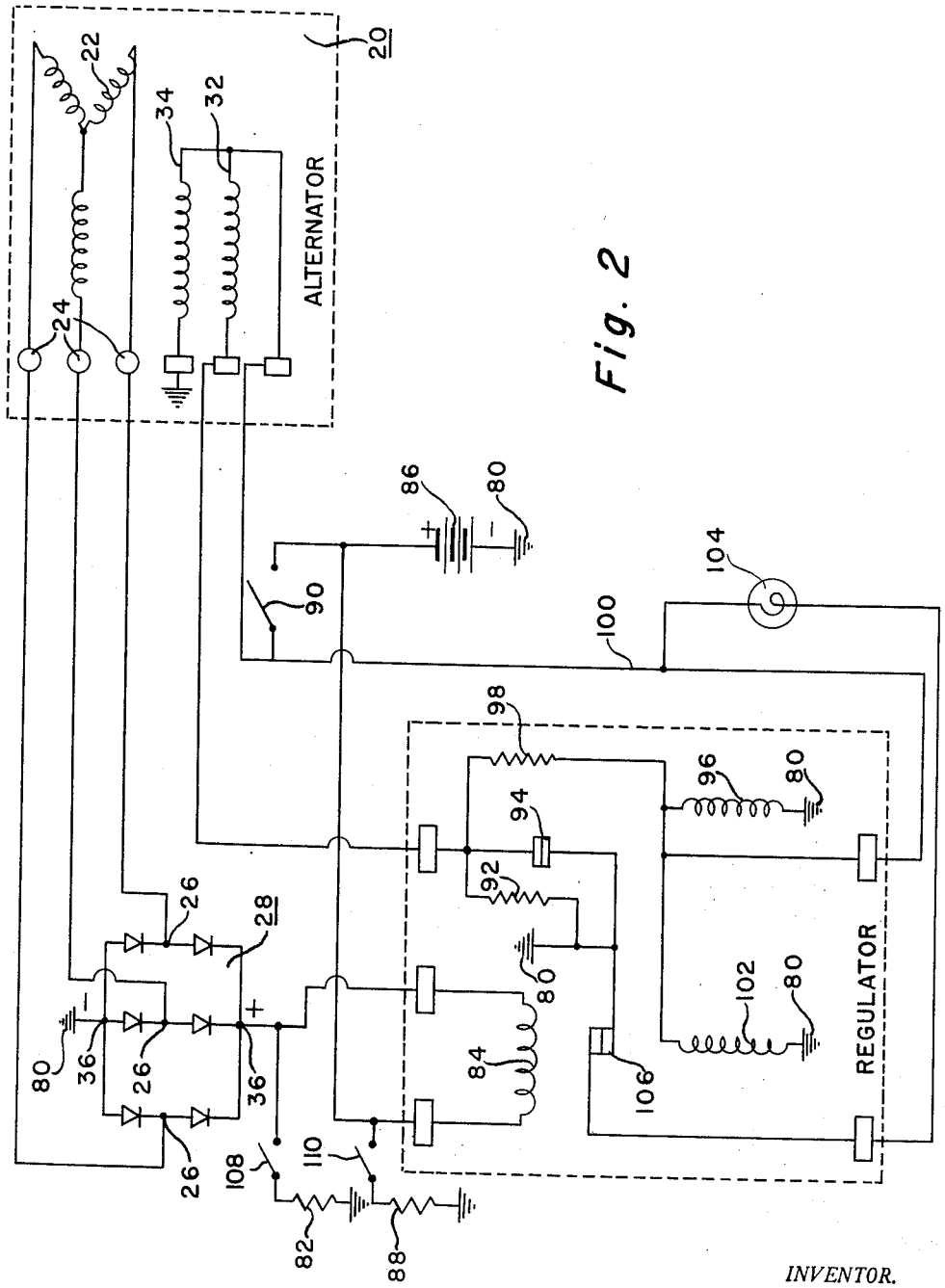

Figure 2 diagrammatically shows a circuit diagram according to another embodiment of the present invention.

In the drawings and in Figure 1 particularly, an alternator 20 is shown. This alternator may be either of the Y or delta connected types and is here shown as having a Y connected stator winding 22 which, through load terminals 24, supplies alternating current to the input terminals 26 of a power rectifier 28. The alternator 20 is provided with a conventional type exciting field 30 which may have a main coil 32 and a reverse coil 34 to provide the alternator 20 with the proper current and voltage output characteristics when the alternator 20 is driven at variable speeds by the vehicle prime mover, not shown.

The output terminals 36 of rectifier 28 are connected through a suitable direct current circuit which includes a pair of normally open contacts 38 and 40 and a storage battery 42 which has one of its terminals grounded at 44. The contacts 38 and 40 are part of a cutout relay that has its energizing winding 46 connected in circuit with a suitable switch means 48. This switch means 48 is preferably arranged to be responsive to the operation of the prime mover and may be an oil pressure switch which is closed whenever the prime mover is operating to provide the necessary pressure to close the switch means 48. When the contacts of switch 48 are initially closed, a circuit between the terminal 36 and the ground 44 is closed and the winding 46 will be energized by the output current of the rectifier 28. The energization of winding 46 will cause contacts 38 and 40 to complete the circuit between terminal 36 and battery 42. After the circuit to winding 46 is closed, this winding 46 will be energized by either the output of the battery 42 or the rectifier 28 so that the contacts 38 and 40 will be closed even if the output of the alternator 20 ceases as long as switch means 48 is closed.

The generator field 32 is connected to the battery 42 through the ignition switch 47 of the prime mover. This switch, when closed, will complete the circuit through the field winding 32 and the voltage regulator 50. The regulator 50 has a pair of normally closed contacts 52 and 54, which are adapted to be opened when the energization of the coil winding 56 of the regulator 50 exceeds a predetermined value in response to the potential which is present between the direct current circuit, i. e., output terminal 36 and the ground 44. The voltage regulator 50 may be of any suitable type of the vibratory type, or carbon pile type, and may be connected in the field 32 circuit to be responsive to the potential of the output circuit of rectifier 28 in a manner well known to those skilled in the art. The regulator 50, here shown, has a regulating resistance 58 and an arc reducing resistance 69 which will minimize the arcing across contacts 52 and 54 when they open. Included also in Figure 1 is an external direct load 62 which may comprise the lights, horns and other accessories of the vehicle which is controlled by a switch 64.

The present invention is directed to an indicating means which includes the indicating lamp 66 and the resistance 68 which, as here shown, is connected through suitable leads to the output terminal 36 of the rectifier 28. The indicating lamp 66, which may be suitably mounted on the dashboard of the vehicle, is connected between the output terminal 36 of rectifier 28 through switch 47 with the battery 42. When the parts of the circuit are so connected and the switch 47 is closed, the battery voltage will be applied across the field 32, and across the indicator lamp 66, with the resistance 68 in series. When this circuit is completed, a portion of the battery 42 voltage will be impressed across the indicating light 66 and the remaining portion will be dissipated over resistance 68. The indicator light is designed to glow at a portion of the battery voltage, i. e., 6 volts in a 12 volt battery system, and will glow when the alternator is not producing an A. C. voltage. When the engine is started, the pressure switch 48 will close and the alternator will produce an A. C. voltage at load terminals 24. This voltage will be rectified to D. C. voltage by the rectifier 28, so that the winding 46 of the cutout relay is energized and contacts 38 and 40 are closed. The closure of the contacts 38 and 40 will cause substantially the same potential to be impressed on both sides of the indicating light 66 and, hence, there will be no substantial voltage dropped thereacross and the light will be extinguished. It is to be appreciated that the voltage regulator 50 is preferably adjusted so that the voltage at the terminal 36 of the rectifier 28 will be higher than that of battery 42 so that current will flow through the battery 42 through the contacts 38 and 40. This difference in potential between the alternator and battery will not be sufficient to cause the lamp 66 to become incandescent. When, however, a failure of the alternator occurs, the battery voltage will be impressed across the resistance 68 and light 66 so the indicating light 66 will become incandescent and warn the operator of the vehicle of the failure of the alternating current generating system.

In Figure 2 of the drawings, the alternator 20, with its field windings 32 and 34 and output terminals 24, the rectifier 28 with its terminals 26 and 36, are of the type and connected in circuit with each other as described in the embodiment shown in Figure 1. The power rectifier 28 has its D. C. load terminals 36, one of which is grounded at 80, connected through a switch 108 to a portion 82 of the vehicle load circuit which may include the vehicle lights, etc. The D. C. load terminals 36 of rectifier 28 are also connected through a coil winding 84 of a relay. This coil winding 84 is connected in series with the remainder of the direct current load which includes a storage battery 86, which has one terminal grounded at 80, and through a switch 110, other portions 88 of the D. C. load which preferably include the horn and starter circuits.

The ignition switch 90 is connected to control the circuit from either the battery 86 or rectifier 28 to the series circuit which includes the field winding 32, the voltage regulator with its current limiting resistance 92 and its contacts 94 and the voltage regulator sensing coil 96 which, when sufficiently energized, will cause the contacts 94 to open and cause the current which normally passes through field 32 and through closed contacts 94 to ground 80, to pass through resistance 92 to ground 80 and thus reduce the excitation of the field 32. The energizing coil 96 of the voltage regulator and the relay shunt coil 102 each have one end grounded at 80 and the other end connected through lead 100 with the ignition switch 90 so that they are responsive to either the battery 86 or rectifier 28 output voltage when the switch 90 is closed. The resistance 98 is a current limiting resistance and reduces arcing across the contacts 94 when they open and close. The indicator lamp 104 is connected in series with the switch 90, lead 100 and the normally closed relay contacts 106 to ground 80.

From the above connections, it is apparent the system will operate as follows to indicate the periods when the alternator 20 output through rectifier 28 is insufficient to charge the battery 86.

When the switch 90 is initially closed, the alternator field 32 will be energized. Simultaneously, the indicator light 104 which is grounded through relay contacts 106 will be energized. These contacts 106 will, at this time, be on the verge of opening as the coil 102 will be energized. Simultaneously, with the energization of the generator field 32 and the indicator light 104, the voltage regulator sensing coil 96 will be energized.

When the alternator rotor 22 revolves, A. C. power will be developed at the load terminals 24. This A. C. power is rectified to D. C. by the rectifier 28 whose D. C. load terminals are designated as 36. The setting of the voltage regulator is such that the contacts 94 will be opened only when the voltage impressed by the rectifier on the D. C. circuit exceeds the battery voltage so that current will flow through the series coil 84 to battery 86. The coils 84 and 102 are wound so that their magnetic flux will aid each other when the current is flowing from the rectifier to the battery during periods when the battery 86 is being charged. When the coils 84 and 102 are aiding each other, the contacts 106 will open and the circuit from indicator light 104 through the contacts 106 to ground 80 will be broken and the light will no longer be incandescent to indicate that the battery is not being charged. If, for some reason, the alternator should fail to provide a sufficient voltage at the output terminals 36 of the rectifier 28 to charge the battery 86, current will not flow from the rectifier 28 to the battery 86 and the contacts 106 will remain closed to complete the circuit through the indicating light which will then become incandescent and indicate the fact that the alternator is not producing the required output. Further, if there is an excessive current load present across the loads 82, the flow of current will be from the battery to the load 82 and the magnetic flux of the series coil 84 will oppose the flux of coil 102 and the contacts 106 will remain closed so that the indicator light will be incandescent. In this connection, the extremely heavy loads which are present in the vehicle such as the horn and starting loads, are connected so that the current to these loads does not pass through the series current winding 84. This arrangement will prevent the indicator light 104 from being energized when these heavy loads are present.

When switch 90 is in the open position and loads 88 and 82 are disconnected from the battery by opening switches 110 and 108, there will be very little, if any, discharge of the battery as the blocking effect of rectifier 28 is utilized to prevent the passage of current to ground 80. When this effect in the rectifier 28 is utilized, the need for a cutout or series relay as is normally employed by systems of this type is eliminated.

It is clearly apparent that while the systems herein shown are supplied with a bulb to indicate when the battery charging circuit is functioning properly, other pieces of electrical equipment such as buzzers, etc., suitably wired to the circuit may be employed without departing from the spirit or scope of the present invention.

While the embodiments of the present invention as herein disclosed constitute preferred forms, it is to be understood that other forms might be adopted.

What is claimed is as follows:

1. In an electric generating system for a motor vehicle having an ignition switch, the combination comprising an alternator having output terminals, a rectifier, a direct current load circuit including a storage battery connected through said switch to an ignition system and through said rectifier with said output terminals and means connected in circuit between said battery and rectifier for indicating that the output of said alternator is sufficient to charge said battery, said means including an indicator lamp connected directly through said switch with said battery.

2. A storage battery charging system in a motor vehicle having an ignition switch, the combination comprising; an alternator having output terminals, a rectifier, a direct current load circuit including said storage battery connected through said switch to an ignition system and through said rectifier with said terminals, an indicating light connected directly through said switch with said battery, and through said rectifier with the alternator to indicate when the output of said alternator through said circuit is sufficient to charge said battery.

3. In an electric generating system for a motor vehicle, a variable speed alternator having output terminals, a rectifier, a direct current load circuit including a storage battery connected through said rectifier with the output terminals of said alternator and means including an indicator lamp connected to be responsive to the alternator and battery potential for indicating when the potential of said alternator is at least equal to the potential of the battery.

4. In an electric generating system for a motor vehicle, an alternator having an exciting field winding and output terminals, a rectifier, a storage battery, a direct current battery charging circuit connecting said battery through the rectifier with the output terminals of said alternator, means responsive to the potential of said circuit for controlling the energization of the field of said alternator, an ignition switch in circuit with said field and battery and means in circuit through the rectifier with said alternator and in circuit with the ignition switch for indicating when said alternator is charging said battery.

5. In an electric generating system for a motor vehicle, an alternator having a field winding and output terminals, a rectifier, a storage battery, a direct current battery charging circuit connecting said battery through the rectifier with the output terminals of said alternator, means responsive to the potential of said circuit for controlling the energization of the field of said alternator, an ignition switch in circuit with said field and battery and means including a relay in circuit with said alternator and ignition switch for indicating when said alternator is charging said battery.

6. In an electric generating system for a motor vehicle, an alternator having a field winding and output terminals, a rectifier, a storage battery, a direct current battery charging circuit connecting said battery through the rectifier with the output terminals of said alternator, means responsive to the potential of said circuit for controlling the energization of the field of said alternator, an ignition switch in circuit with said field and battery and means including a relay and a lamp bulb in circuit with said alternator and ignition switch for indicating when said alternator is charging said battery.

7. In an electric generating system for a motor vehicle, an alternator driven by the prime mover of said vehicle and having a field winding and output terminals, a rectifier, a storage battery, a direct current battery charging circuit connecting said battery through the rectifier with the output terminals of said alternator, switch means operably connected with the prime mover and said circuit for controlling the opening and closing of said circuit in response to the operation of said prime mover, means responsive to the potential of said circuit for controlling the energization of the field of said alternator, an ignition switch in circuit with said field and battery and means in circuit with said alternator and ignition switch for indicating when said alternator is charging said battery.

8. In an electric generating system for a motor vehicle, an alternator having a field winding and output terminals, a rectifier, a storage battery, a direct current circuit for charging said battery connecting said battery through said rectifier with the output terminals of said alternator, means responsive to the potential of said circuit for controlling the energization of the field of said alternator and an indicating means including; a bulb, a relay having a pair of normally closed switches in circuit with said battery and bulb, said relay having a magnetic coil in said direct current circuit and a second magnetic coil in circuit with said field, said coils being adapted, when energized, to move said contacts and open the circuit between said battery and bulb.

9. In an electric generating system for a motor vehicle, an alternator having a field winding and output terminals, a rectifier, a storage battery, a direct current battery charging circuit connecting said battery through the rectifier with the output terminals of said alternator, means responsive to the potential of said circuit for controlling the energization of the field of said alternator, an ignition switch in circuit with said field and battery and means including a bulb connected in circuit through the rectifier with said alternator and in circuit with the ignition switch for indicating when said alternator is charging said battery.

References Cited in the file of this patent

UNITED STATES PATENTS

| | | |
|---|---|---|
| 2,064,460 | Carr et al. | Dec. 15, 1936 |
| 2,101,407 | Moreland | Dec. 7, 1937 |
| 2,286,101 | Norberg et al. | June 9, 1942 |
| 2,324,188 | Beetern | July 13, 1943 |
| 2,366,505 | Fletcher | Jan. 2, 1945 |
| 2,511,631 | Gordon | June 13, 1950 |
| 2,534,633 | Smith | Dec. 19, 1950 |
| 2,759,176 | Kennedy | Aug. 14, 1956 |